(12) United States Patent
Ito et al.

(10) Patent No.: US 12,710,108 B2
(45) Date of Patent: Aug. 18, 2026

(54) VALVE DEVICE

(71) Applicant: KAWASAKI JUKOGYO KABUSHIKI KAISHA, Kobe (JP)

(72) Inventors: Noboru Ito, Kobe (JP); Hiroaki Fujiwara, Kobe (JP); Kiminori Morita, Kobe (JP); Masahiro Matsuo, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 18/834,725

(22) PCT Filed: Nov. 21, 2022

(86) PCT No.: PCT/JP2022/042953
§ 371 (c)(1),
(2) Date: Jul. 31, 2024

(87) PCT Pub. No.: WO2023/157409
PCT Pub. Date: Aug. 24, 2023

(65) Prior Publication Data

US 2025/0129857 A1 Apr. 24, 2025

(30) Foreign Application Priority Data

Feb. 18, 2022 (JP) ................................ 2022-023646

(51) Int. Cl.

| | |
|---|---|
| ***F16K 31/528*** | (2006.01) |
| ***F16K 31/42*** | (2006.01) |
| ***F16K 31/44*** | (2006.01) |
| *F16K 11/07* | (2006.01) |

(52) U.S. Cl.
CPC .......... *F16K 31/5286* (2013.01); *F16K 31/42* (2013.01); *F16K 31/44* (2013.01); *F16K 11/07* (2013.01)

(58) Field of Classification Search
CPC ....... F16K 31/42; F16K 31/44; F16K 31/5286
See application file for complete search history.

(56) References Cited

U.S. PATENT DOCUMENTS 3,599,675 A * 8/1971 Sievenpiper ............ F16K 31/44 137/596.2
3,677,281 A * 7/1972 Tennis .................... F16K 31/44 251/280
3,818,926 A * 6/1974 Wohlwend .......... F16K 31/5286 60/427

(Continued)

FOREIGN PATENT DOCUMENTS

JP 2020-041660 A 3/2020

*Primary Examiner* — Umashankar Venkatesan
(74) *Attorney, Agent, or Firm* — Oliff PLC

(57) ABSTRACT

A valve device (100) includes an operation shaft (50) operable to be moved along a rotation axis A1 of an operation pin (40) to be switched between a coupled state in which the operation shaft (50) is coupled to the operation pin (40) and rotates together with the operation pin (40), and an uncoupled state in which the operation shaft (50) is not coupled to the operation pin (40) and supports the operation pin (40) such that the operation pin (40) is rotatable. The operation pin (40) is operable to be rotated about the rotation axis A1 such that a spool (20) is moved when the operation shaft (50) is rotated about the rotation axis A1 in the coupled state.

11 Claims, 6 Drawing Sheets

(56) References Cited

U.S. PATENT DOCUMENTS

| | | | | |
|---|---|---|---|---|
| 10,202,987 | B2 * | 2/2019 | Strobel | F16K 31/426 |
| 11,466,706 | B2 * | 10/2022 | Fujiwara | F15B 11/003 |
| 2020/0263808 | A1 * | 8/2020 | Bushman | F16K 37/0041 |
| 2022/0025990 | A1 | 1/2022 | Ito et al. | |

* cited by examiner

VALVE DEVICE

TECHNICAL FIELD

The present disclosure relates to a valve device, and more particularly, it relates to a valve device including a spool to switch a liquid flow path or adjust a liquid flow rate.

BACKGROUND ART

Conventionally, a valve device including a spool to switch a liquid flow path is known. Japanese Patent Laid-Open No. 2020-041660 discloses a valve device including a spool to switch a liquid flow path, an operating pin that is connected to the spool and swings as the spool moves in an axial direction of the spool, a rotating shaft that is connected to the operating pin and rotates as the operating pin swings, a coupling plug operable to be switched between a coupled state in which the coupling plug is coupled to the rotating shaft and a canceled state in which the coupling plug is not coupled to the rotating shaft, and an operating lever coupled to the coupling plug. In the valve device disclosed in Japanese Patent Laid-Open No. 2020-041660, the operating pin is connected to the rotating shaft by a fixing pin, and the operating lever is manually operated with the coupling plug switched to the coupled state such that the spool can be moved along the axial direction.

PRIOR ART

Patent Document

Patent Document 1: Japanese Patent Laid-Open No. 2020-041660

SUMMARY OF THE INVENTION

In the valve device disclosed in Japanese Patent Laid-Open No. 2020-041660, it is necessary to perform an operation to connect the operating pin to the rotating shaft by the fixing pin inside a cover in which the spool is provided, and thus an operation to assemble the valve device becomes complex.

The present disclosure is intended to solve the above problem. The present disclosure aims to provide a valve device including a manually movable spool and capable of being easily assembled.

In order to attain the aforementioned object, a valve device according to one aspect includes a spool operable to move in an axial direction of the spool to switch a liquid flow path or adjust a liquid flow rate, an operation pin connected to the spool and operable to rotate about a rotation axis of the operation pin as the spool moves in the axial direction, and an operation shaft operable to be moved along the rotation axis of the operation pin to be switched between a coupled state in which the operation shaft is coupled to the operation pin and rotates together with the operation pin, and an uncoupled state in which the operation shaft is not coupled to the operation pin and supports the operation pin such that the operation pin is rotatable. The operation pin is operable to be rotated about the rotation axis such that the spool is moved when the operation shaft is rotated about the rotation axis in the coupled state.

Accordingly, the operation shaft operated by an operator when manually moving the spool is moved along the rotation axis such that the operation shaft can be switched between the coupled state in which the rotation shaft is directly coupled to the operation pin and the uncoupled state in which the rotation shaft is not coupled to the operation pin, and thus unlike the conventional configuration, it is not necessary to separately provide a rotation shaft connected to the operation pin. Consequently, when the valve device is assembled, it is not necessary to perform an operation to connect the operation pin to the rotation shaft within a cover in which the spool is provided, and thus the valve device can be easily assembled.

According to the present disclosure, as described above, it is possible to easily assemble the valve device including the manually movable spool.

MODES FOR CARRYING OUT THE INVENTION

First Embodiment

The configuration of a valve device 100 according to a first embodiment is now described with reference to FIGS. 1 to 9.

Figure 1:
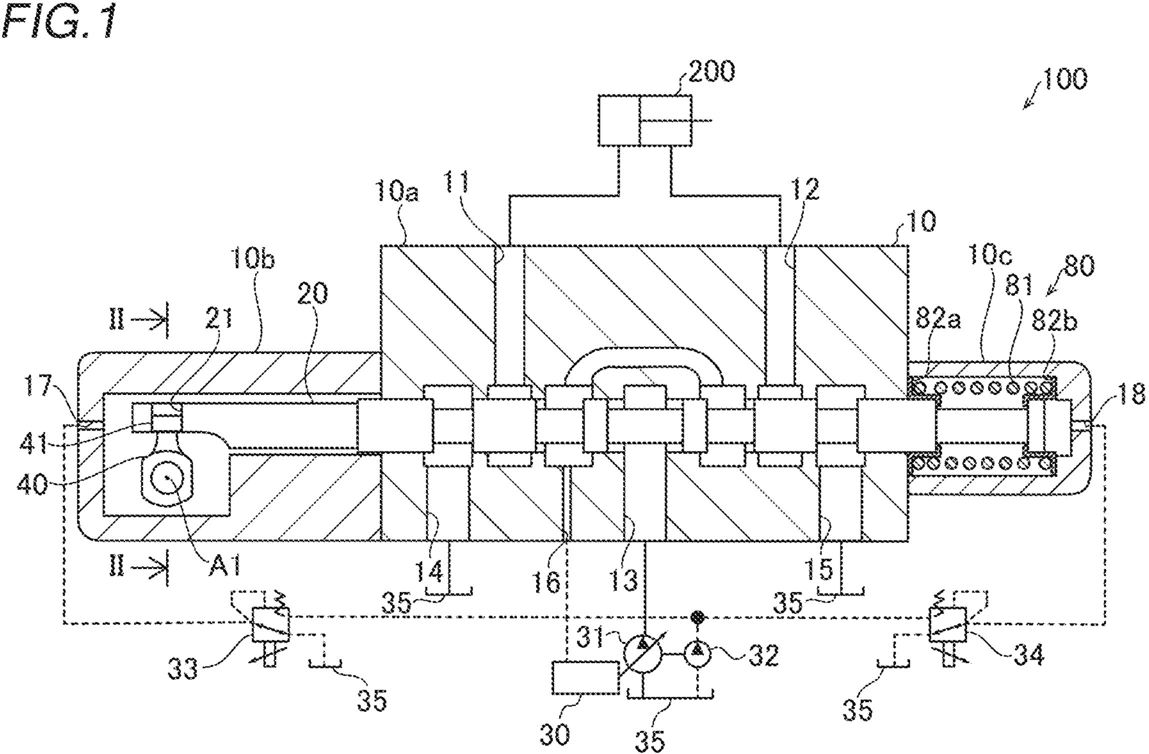
FIG. 1 is a diagram schematically showing a valve device according to a first embodiment.

As shown in FIG. 1, the valve device 100 operates a load 200 by switching a flow path to supply a hydraulic fluid such as oil to the load 200. The valve device 100 may adjust the flow rate of the hydraulic fluid without switching the flow path. The load 200 includes equipment mounted on agricultural machinery or construction machinery, for example. For example, the load 200 is operated to raise and lower an arm or a fork, or to perform excavation. The hydraulic fluid is supplied to the load 200 via the valve device 100, and the load 200 operates by moving a rod within a cylinder. The load 200 includes a hydraulic motor such as a turning motor for a construction machine, and the hydraulic fluid is supplied to the load 200 via the valve device 100 such that the load 200 is rotationally driven.

The valve device 100 includes a housing 10 and a spool 20. The housing 10 includes a first portion 10*a*, a second portion 10*b*, and a third portion 10*c*. Flow paths 11, 12, 13, 14, 15, 16, 17, and 18 through which the hydraulic fluid flows are provided in the first portion 10*a* of the housing 10. The spool 20 moves in an axial direction of the spool 20 to switch a flow path for the hydraulic fluid.

The valve device 100 includes a tilt controller 30, a pump 31, and a pump 32, and the hydraulic fluid is sent to the valve device 100. The pump 31 is a variable displacement swash plate pump including a swash plate, for example. The tilt controller 30 is provided to change the tilt angle of the swash plate of the pump 31. The pump 31 is coupled to a drive such as an engine or an electric motor, and is rotated by rotation of the drive. Furthermore, the pump 31 discharges the hydraulic fluid at a flow rate that corresponds to the rotational speed of the drive and the discharge capacity of the pump 31. The discharged hydraulic fluid flows from the pump 31 into the valve device 100 through the flow path 13.

The hydraulic fluid that has flowed into the flow path 13 of the valve device 100 from the pump 31 is sent to the load 200 from one of the flow paths 11 and 12 depending on the position of the spool 20. Furthermore, the hydraulic fluid sent from the load 200 to the valve device 100 is returned to a tank 19 from the other of the flow paths 11 and 12 through the flow path 14 or 15.

The spool 20 has a cylindrical shape and is movable to three positions: a neutral position, a raised position, and a lowered position. Furthermore, the connection states of the flow paths 11 to 15 are switched at the three positions. Specifically, when the spool 20 is moved to the raised position, the flow path 13 is connected to the flow path 11, and the flow path 12 is connected to the flow path 15. When the spool 20 is moved to the lowered position, the flow path 13 is connected to the flow path 12, and the flow path 11 is connected to the flow path 14. Thus, the moving direction of the rod of the load 200 in the case of the raised position is opposite to the moving direction of the rod of the load 200 in the case of the lowered position. When the spool 20 is returned to the neutral position, all of the flow paths 11 to 15 are blocked. Thus, the flow of the hydraulic fluid into and out of the load 200 is stopped. Consequently, the operation of the load 200 is stopped. In FIG. 1, a state in which the spool 20 is moved to the left is a state in which the spool 20 is at the raised position, and a state in which the spool 20 is moved to the right is a state in which the spool 20 is at the lowered position.

A pilot pressure acts on both ends of the spool 20. The spool 20 moves between the three positions, the neutral position, the raised position, and the lowered position, due to the acting pilot pressure and the restoring force of a spring mechanism 80 of the third portion 10*c*. Specifically, the spool 20 is moved to the neutral position by the restoring force of the spring mechanism 80 when no pilot pressure acts. The spool 20 is moved to the raised position or the lowered position by the action of the pilot pressure.

The spring mechanism 80 is provided in the third portion 10*c*. The spring mechanism 80 returns the spool 20 to the neutral position. The spring mechanism 80 includes a spring 81 and a pair of spring seats 82*a* and 82*b*.

The spring 81 is interposed between the pair of spring seats 82*a* and 82*b*. The pair of spring seats 82*a* and 82*b* contact the spool 20 on the diametrically inner side, and contact the spring 81 on the diametrically outer side. The spring 81 is a compression coil spring, and applies an urging force to position the spool 20 at the neutral position. That is, when the spool 20 is moved to the left and is located at the raised position, the urging force is applied to the spool 20 to the right. When the spool 20 is moved to the right and is located at the lowered position, the urging force is applied to the spool 20 to the left.

The valve device 100 includes the pump 32 and solenoid valves 33 and 34, and the pressure of a pilot fluid that causes a pilot pressure to act on the valve device 100 is controlled. The pilot fluid is the same as the hydraulic fluid sent to the load 200, for example. The pump 32 is, for example, a constant displacement pump such as a swash plate pump or a gear pump. The pump 32 is coupled to a drive such as an engine or an electric motor, and is rotated by rotation of the drive. Furthermore, the pump 32 discharges the pilot fluid at a flow rate that corresponds to the rotational speed of the drive and the discharge capacity of the pump 32. The discharged pilot fluid flows from the pump 32 into the valve device 100 through the flow path.

The solenoid valve 33 is opened, and the solenoid valve 34 is closed such that the pilot fluid flows into the valve device 100 through the flow path 17. The solenoid valve 33 is closed, and the solenoid valve 34 is opened such that the pilot fluid flows into the valve device 100 through the flow path 18. Thus, the direction of the pilot pressure applied to the spool 20 is switched.

Figure 2:
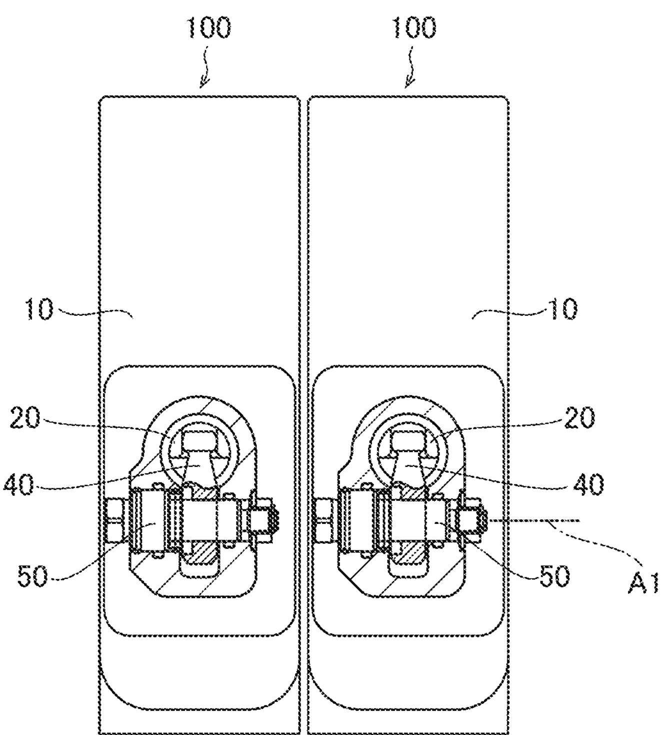
FIG. 2 is a sectional view taken along the line II-II in FIG. 1.

As shown in FIG. 2, a plurality of valve devices 100 may be arranged side by side. The plurality of valve devices 100 are provided so as to correspond to a plurality of loads 200.

As shown in FIG. 1, the valve device 100 includes an operation pin 40 that is connected to the spool 20 and rotates about a rotation axis A1 as the spool 20 moves in the axial direction.

The operation pin 40 includes an engaged portion 41. The engaged portion 41 of the operation pin 40 engages with an engaging portion 21 provided in the vicinity of an end of the spool 20. The operation pin 40 is housed within the second portion 10*b* of the housing 10.

Figure 3:
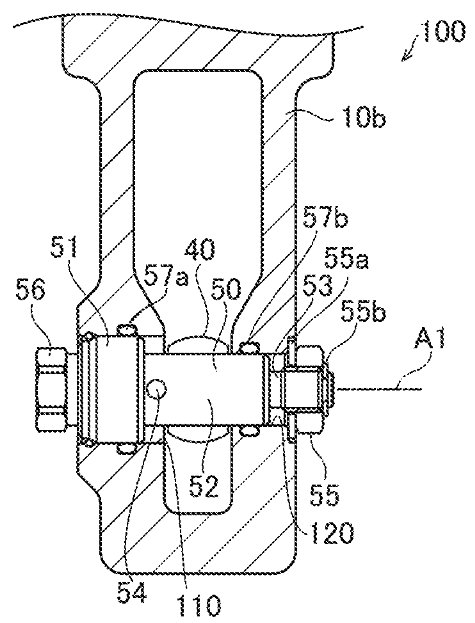
FIG. 3 is a diagram showing a portion of the valve device according to the first embodiment in which an operation shaft is located.
Figure 4:
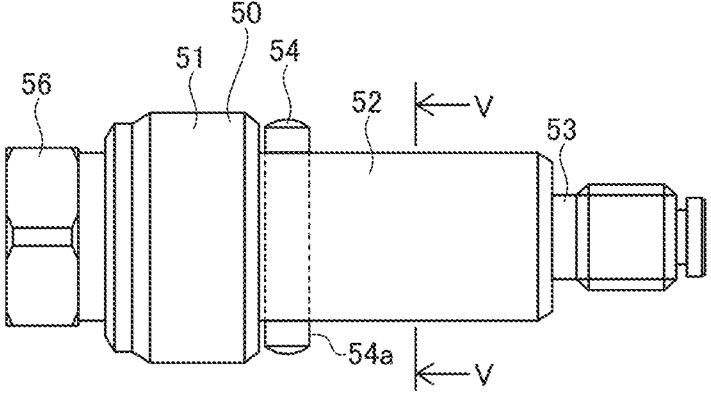
FIG. 4 is a diagram showing the operation shaft of the valve device according to the first embodiment.
Figure 5:
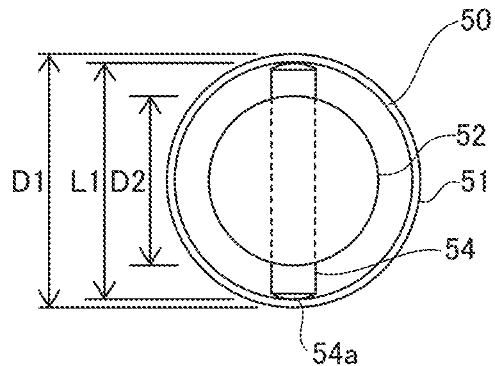
FIG. 5 is a sectional view taken along the line V-V in FIG. 4.

The valve device 100 includes an operation shaft 50 provided along the rotation axis A1 of the operation pin 40, as shown in FIGS. 3 to 5. In the first embodiment, the operation shaft 50 is moved along the rotation axis A1 of the operation pin 40 to be switched between a coupled state (see FIG. 9) in which the operation shaft 50 is coupled to the operation pin 40 and rotates together with the operation pin 40, and a uncoupled state (see FIG. 8) in which the operation shaft 50 is not coupled to the operation pin 40 and supports the operation pin 40 such that the operation pin 40 is rotatable.

Figure 6:
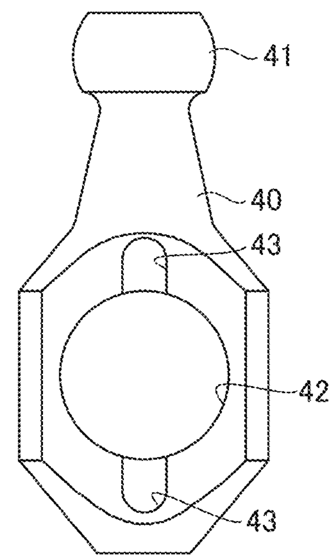
FIG. 6 is a front view showing an operation pin of the valve device according to the first embodiment.
Figure 7:
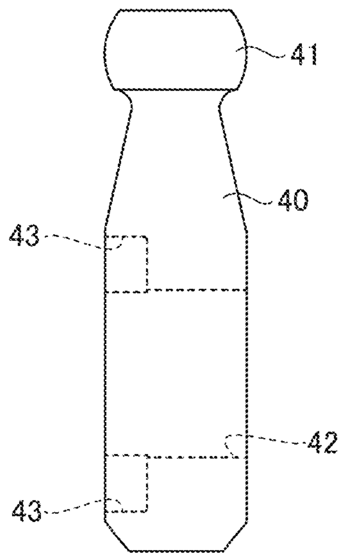
FIG. 7 is a side view showing the operation pin of the valve device according to the first embodiment.

The operation pin 40 includes the engaged portion 41, a through-hole 42, and a plurality of grooves 43, as shown in FIGS. 6 and 7. The engaged portion 41 engages with the engaging portion 21 of the spool 20. The operation shaft 50 is inserted into the through-hole 42. The grooves 43 engage with the operation shaft 50. Specifically, protrusions 54 provided on the operation shaft 50 are fitted into and engages with the grooves 43. The grooves 43 are examples of a "first engaging portion" in the claims.

The plurality of grooves 43 of the operation pin 40 are provided with the rotation axis A1 interposed therebetween. Specifically, the grooves 43 are provided at both ends of the through-hole 42 in a radial direction of the through-hole 42. A groove 43 may be provided only at one end of the through-hole 42 in the radial direction. Furthermore, a protrusion 54 may be provided only at one end of the operation shaft 50 in a radial direction of the operation shaft 50.

Figure 8:
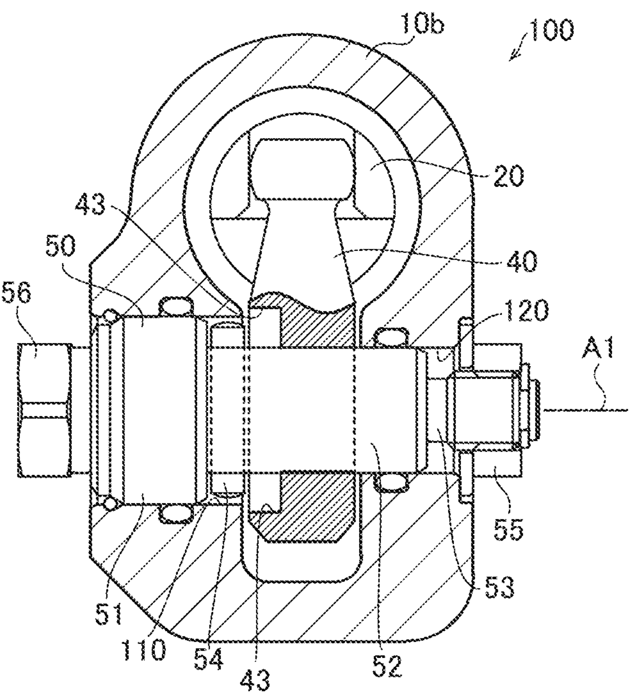
FIG. 8 is a diagram showing the operation shaft and the operation pin of the valve device according to the first embodiment in an uncoupled state.
Figure 9:
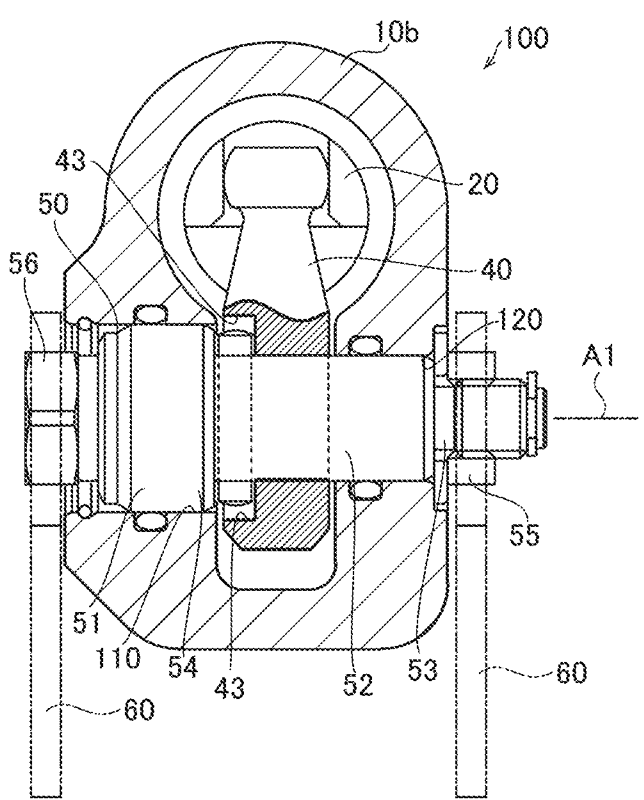
FIG. 9 is a diagram showing the operation shaft and the operation pin of the valve device according to the first embodiment in a coupled state.

As shown in FIG. 9, the operation pin 40 enters the coupled state when the protrusions 54 engage with the grooves 43. As shown in FIG. 8, the operation pin 40 enters the uncoupled state when the protrusions 54 do not engage with the grooves 43.

In an emergency, for example, the operation pin 40 is rotated about the rotation axis A1 such that the spool 20 can be manually moved. Specifically, with the operation pin 40 and the operation shaft 50 in the coupled state, the operation shaft 50 is rotated about the rotation axis A1 such that the operation pin 40 is rotated about the rotation axis A1. This causes the spool 20 to move. Furthermore, during normal operation of the valve device 100, the operation shaft 50 is in the uncoupled state in which the operation shaft 50 is not coupled to the operation pin 40. Thus, when the spool 20 moves due to the action of the pilot pressure, the operation shaft 50 does not rotate even when the operation pin 40 rotates as the spool 20 moves.

The operation shaft 50 includes a large diameter portion 51 and a small diameter portion 52, as shown in FIG. 4. The small diameter portion 52 passes through the operation pin 40 and has a smaller diameter than the diameter of the large diameter portion 51. Furthermore, the operation shaft 50 includes the protrusions 54 that engage with the grooves 43 of the operation pin 40. The operation shaft 50 also includes a male threaded portion 53 provided at a first end in the direction of the rotation axis A1, and a female threaded member 55 to be screwed into the male threaded portion 53. The operation shaft 50 also includes a tool engaging portion 56 that is provided at a second end in the direction of the rotation axis A1 and with which a tool 60 engages. The protrusions 54 are examples of a "second engaging portion" in the claims.

As shown in FIGS. 4 and 5, the protrusions 54 of the operation shaft 50 include a coupling pin 54*a* inserted into the operation shaft 50 in the radial direction of the operation shaft 50. The coupling pin 54*a* is press-fitted into the operation shaft 50 in the radial direction of the operation shaft 50. The coupling pin 54*a* is press-fitted into the operation shaft 50 such that the protrusions 54 are formed at both ends of the small diameter portion 52 in the radial direction of the operation shaft 50.

The coupling pin 54*a* has a cylindrical shape. In other words, each of the protrusions 54 of the operation shaft 50 has a curved surface. As shown in FIG. 5, the maximum outside dimension L1 of the protrusions 54 of the operation shaft 50 is smaller than the diameter D1 of the large diameter portion 51 and is larger than the diameter D2 of the small diameter portion 52.

As shown in FIG. 3, the female threaded member 55 is screwed into the male threaded portion 53. A washer 55*a* and a retaining ring 55*b* are provided on the male threaded portion 53. The female threaded member 55 is a hexagonal nut, for example. As shown in FIG. 9, the female threaded member 55 is rotated using the tool 60. The tool 60 is a hexagonal spanner or a hexagonal wrench, for example.

The female threaded member 55 is rotated about the rotation axis A1 with respect to the male threaded portion 53 such that the operation shaft 50 is moved along the rotation axis A1 to be switched between the coupled state and the uncoupled state.

Specifically, the female threaded member 55 is rotated so as to be tightened on the male threaded portion 53 such that the operation shaft 50 is moved and switched to the coupled state. Furthermore, the female threaded member 55 is rotated so as to be loosened from the male threaded portion 53 such that the operation shaft 50 is moved and switched to the uncoupled state. Specifically, after the female threaded member 55 is loosened from the male threaded portion 53, a pilot pressure is applied inside the housing 10*b* such that the operation shaft 50 is moved to the left and switched to the uncoupled state.

The tool engaging portion 56 is provided to move the spool 20 via the operation pin 40 by engaging the tool 60 with the tool engaging portion 56 and rotating the operation shaft 50 in an emergency. That is, when the tool 60 engaged with the tool engaging portion 56 of the operation shaft 50 is rotated in the coupled state, the operation pin 40 is rotated about the rotation axis A1. This causes the spool 20 to move. The tool engaging portion 56 is a head of a hexagonal bolt, for example. Furthermore, the tool 60 is engaged with the tool engaging portion 56 when the female threaded member 55 is rotated. Thus, the operation shaft 50 is held against rotation.

As shown in FIG. 3, the second portion 10*b* of the housing 10 that houses the operation pin 40 includes a first bearing 110 and a second bearing 120. The first bearing 110 guides movement of the operation shaft 50 in the direction of the rotation axis A1 and supports the operation shaft 50 such that the operation shaft 50 is rotatable about the rotation axis A1. The second bearing 120 is located on a side opposite to the first bearing 110 with the operation pin 40 interposed therebetween. Furthermore, the second bearing 120 guides movement of the operation shaft 50 in the direction of the rotation axis A1 and supports the operation shaft 50 such that the operation shaft 50 is rotatable about the rotation axis A1.

The first bearing 110 supports the large diameter portion 51 of the operation shaft 50 such that the large diameter portion 51 is rotatable. The second bearing 120 supports the small diameter portion 52 of the operation shaft 50 such that the small diameter portion 52 is rotatable.

The operation shaft 50 includes seal members 57*a* and 57*b* surrounding the operation shaft 50. The seal member 57*a* surrounds the large diameter portion 51 of the operation shaft 50. That is, the seal member 57*a* is located on the first bearing 110. Furthermore, the seal member 57*b* surrounds the small diameter portion 52 of the operation shaft 50. That is, the seal member 57*b* is located on the second bearing 120.

Advantages of First Embodiment

According to the first embodiment, the following advantages are achieved.

According to the first embodiment, as described above, the valve device 100 includes the operation shaft 50 operable to be moved along the rotation axis A1 of the operation pin 40 to be switched between the coupled state in which the operation shaft 50 is coupled to the operation pin 40 and rotates together with the operation pin 40, and the uncoupled state in which the operation shaft 50 is not coupled to the operation pin 40 and supports the operation pin 40 such that the operation pin 40 is rotatable. Furthermore, the operation pin 40 is operable to be rotated about the rotation axis A1 such that the spool 20 is moved when the operation shaft 50 is rotated about the rotation axis A1 in the coupled state. Accordingly, the operation shaft 50 operated by an operator when manually moving the spool 20 is moved along the rotation axis A1 such that the operation shaft 50 can be switched between the coupled state in which the rotation shaft 50 is directly coupled to the operation pin 40 and the uncoupled state in which the rotation shaft 50 is not coupled to the operation pin 40, and thus unlike the conventional configuration, it is not necessary to separately provide a rotation shaft connected to the operation pin 40. Consequently, when the valve device is assembled, it is not necessary to perform an operation to connect the operation pin 40 to the rotation shaft within a cover in which the spool 20 is provided, and thus the valve device can be easily assembled. Furthermore, it is not necessary to separately provide a rotation shaft connected to the operation pin 40, and thus it is possible to reduce or prevent an increase in the number of components and simplify the device configuration.

According to the first embodiment, as described above, the operation pin 40 includes the grooves 43 as the first engaging portions operable to engage with the operation shaft 50, and the operation shaft 50 includes the protrusions 54 as the second engaging portions operable to engage with the grooves 43 of the operation pin 40. Furthermore, the operation pin 40 is operable to enter the coupled state when the second engaging portions engage with the first engaging portions, and to enter the uncoupled state when the second engaging portions do not engage with the first engaging portions. Accordingly, the operation pin 40 and the operation shaft 50 can be easily brought into the coupled state by engaging the second engaging portions of the operation shaft 50 with the first engaging portions of the operation pin 40.

According to the first embodiment, as described above, the first engaging portions of the operation pin 40 include the grooves 43, and the second engaging portions of the operation shaft 50 include the protrusions 54 operable to engage with the grooves 43. Accordingly, the second engaging portions of the operation shaft 50 can be easily engaged with the first engaging portions of the operation pin 40 by moving the operation shaft 50 such that the protrusions 54 of the operation shaft 50 are inserted into the grooves 43 of the operation pin 40.

According to the first embodiment, as described above, the protrusions 54 of the operation shaft 50 include the coupling pin **54*a* inserted into the operation shaft 50 in the radial direction of the operation shaft 50. Accordingly, the protrusions 54 can be easily provided on the operation shaft 50 by inserting the coupling pin 54*a* into the operation shaft 50**.

According to the first embodiment, as described above, the coupling pin **54*a* has a cylindrical shape. Accordingly, when the cylindrical protrusions 54 are engaged with the grooves 43, the protrusions 54 can be inserted into the grooves 43 from portions of the cylindrical protrusions 54 in which the widths of the side surfaces are small, and thus even when the center positions of the protrusions 54 are deviated from the center positions of the grooves 43, the protrusions 54 can be inserted into the grooves 43. Thus, the protrusions 54 of the operation shaft 50 can be easily and reliably engaged with the grooves 43 of the operation pin 40**.

According to the first embodiment, as described above, the plurality of grooves 43 of the operation pin 40 are provided with the rotation axis A1 interposed therebetween. Accordingly, the protrusions 54 can be engaged with the plurality of grooves 43 provided with the rotation axis A1 interposed therebetween, and thus the operation shaft 50 can be firmly engaged with the operation pin 40.

According to the first embodiment, as described above, the operation shaft 50 includes the large diameter portion 51 and the small diameter portion 52. The small diameter portion 52 passes through the operation pin 40 and has a smaller diameter than the diameter of the large diameter portion 51. Furthermore, the maximum outside dimension L1 of the protrusions 54 of the operation shaft 50 is smaller than the diameter D1 of the large diameter portion 51 and larger than the diameter D2 of the small diameter portion 52. Accordingly, the operation pin 40 can be rotatably supported by the small diameter portion 52 of the operation shaft 50, and the protrusions 54 of the operation shaft 50 can be easily provided by causing the protrusions 54 to protrude from the small diameter portion 52 in the radial direction.

According to the first embodiment, as described above, the housing 10 operable to house the operation pin 40 includes the first bearing 110 to guide movement of the operation shaft 50 in the direction of the rotation axis A1 and support the operation shaft 50 such that the operation shaft 50 is rotatable about the rotation axis A1, and the second bearing 120 on the side opposite to the first bearing 110 with the operation pin 40 interposed therebetween to guide movement of the operation shaft 50 in the direction of the rotation axis A1 and support the operation shaft 50 such that the operation shaft 50 is rotatable about the rotation axis A1. Accordingly, the operation shaft 50 is movably supported by the first bearing 110 and the second bearing 120 with the operation pin 40 interposed therebetween, and thus the operation shaft 50 can be firmly supported and guided during movement. Furthermore, when the operation shaft 50 is manually operated, the operation shaft 50 can be stably rotated by the first bearing 110 and the second bearing 120.

According to the first embodiment, as described above, the operation shaft 50 includes the male threaded portion 53 at the first end in the direction of the rotation axis A1, and the female threaded member 55 operable to be screwed into the male threaded portion 53. Furthermore, the operation shaft 50 is operable to be moved along the rotation axis A1 to be switched between the coupled state and the uncoupled state when the female threaded member 55 is rotated about the rotation axis A1 with respect to the male threaded portion 53. Accordingly, the operation shaft 50 can be easily switched to the coupled state with the operation pin 40 by rotating the female threaded member 55 with respect to the male threaded portion 53.

According to the first embodiment, as described above, the operation shaft 50 includes the tool engaging portion 56 at the second end in the direction of the rotation axis A1 with which the tool 60 engages. Accordingly, when the spool 20 is manually moved in an emergency, for example, the operation shaft 50 can be manually operated by engaging the tool 60 with the tool engaging portion 56. Furthermore, unlike a case in which a lever or the like for manual operation is always provided, the valve device can be downsized and simplified.

According to the first embodiment, as described above, the operation pin 40 is operable to be rotated about the rotation axis A1 when the tool 60 engaged with the tool engaging portion 56 of the operation shaft 50 is rotated in the coupled state. This causes the spool 20 to move. Accordingly, when the spool 20 is manually moved in an emergency, for example, the spool 20 can be easily moved by engaging the tool 60 with the tool engaging portion 56 and rotating the tool 60.

Second Embodiment

A second embodiment is now described with reference to FIGS. 10 to 13. In the second embodiment, an operation shaft 70 is rotated by an operation lever 75 connected to the operation shaft 70 such that a spool 20 is manually moved, unlike the first embodiment in which the tool 60 is engaged with the tool engaging portion 56 of the operation shaft 50 in the coupled state, and the operation shaft 50 is rotated by the tool 60 such that the spool 20 is manually moved. The same or similar configurations as those of the first embodiment are denoted by the same reference numerals, and description thereof is omitted.

Figure 10:
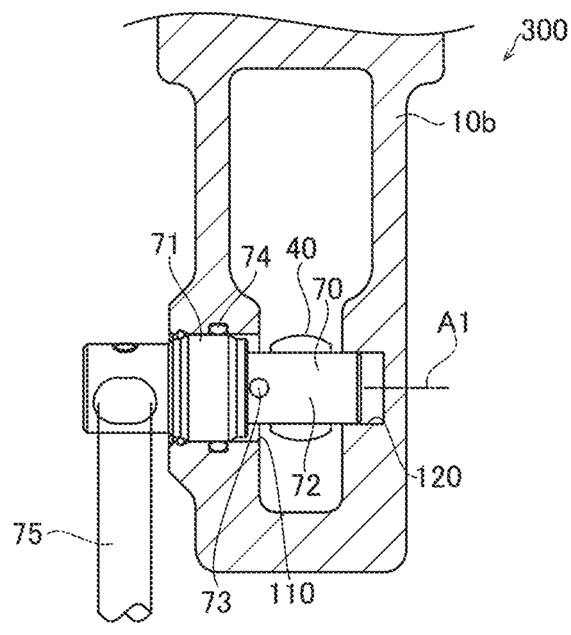
FIG. 10 is a diagram showing a portion of a valve device according to a second embodiment in which an operation shaft is located.
Figure 12:
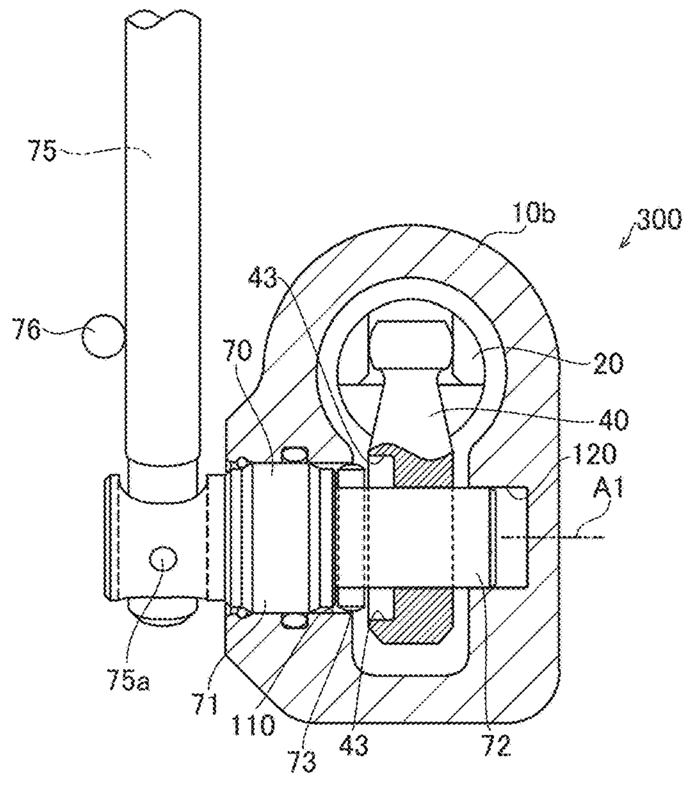
FIG. 12 is a diagram showing the operation shaft and an operation pin of the valve device according to the second embodiment in an uncoupled state.
Figure 13:
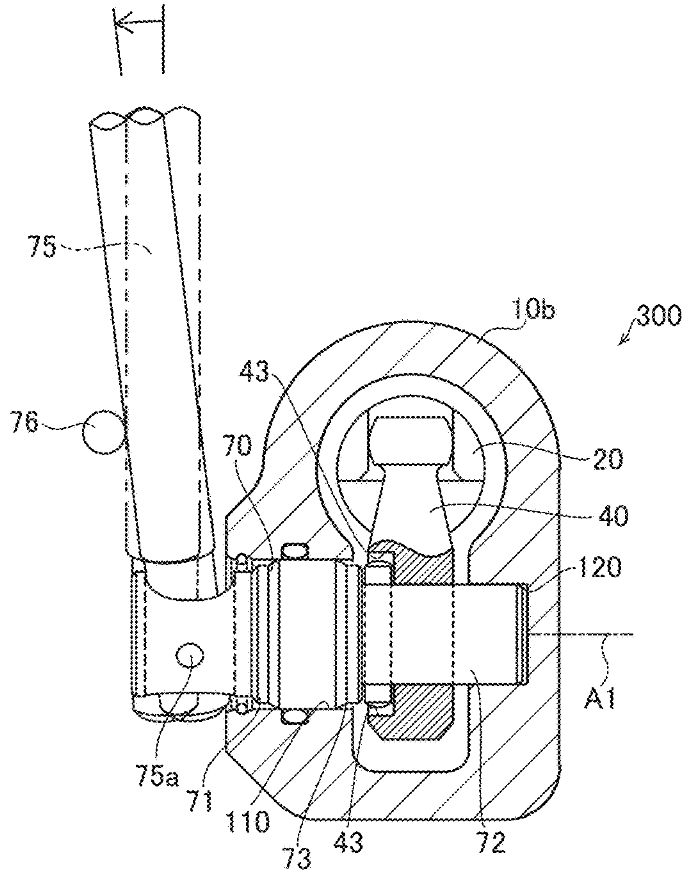
FIG. 13 is a diagram showing the operation shaft and the operation pin of the valve device according to the second embodiment in a coupled state.

As shown in FIG. 10, a valve device 300 includes a housing 10 and the spool 20 (see FIG. 1). As shown in FIGS. 12 and 13, the valve device 300 also includes an operation pin 40 that is connected to the spool 20 and rotates about a rotation axis A1 as the spool 20 moves in an axial direction of the spool 20. In an emergency, for example, the operation pin 40 is rotated about the rotation axis A1 such that the spool 20 can be manually moved.

As shown in FIG. 10, the valve device 300 also includes the operation shaft 70 provided along the rotation axis A1 of the operation pin 40. In the second embodiment, the operation shaft 70 is moved along the rotation axis A1 of the operation pin 40 to be switched between a coupled state (see FIG. 13) in which the operation shaft 70 is coupled to the operation pin 40 and rotates together with the operation pin 40, and an uncoupled state (see FIG. 12) in which the operation shaft 70 is not coupled to the operation pin 40 and supports the operation pin 40 such that the operation pin 40 is rotatable.

The operation shaft 70 is rotated about the rotation axis A1 in the coupled state such that the operation pin 40 is rotated about the rotation axis A1. This causes the spool 20 to move.

The operation shaft 70 includes a large diameter portion 71 and a small diameter portion 52, as shown in FIG. 10. The small diameter portion 52 passes through the operation pin 40 and has a smaller diameter than the diameter of the large diameter portion 51. As shown in FIGS. 12 and 13, the operation shaft 70 includes protrusions 73 that engage with grooves 43 of the operation pin 40. Furthermore, the operation lever 75 is connected to the operation shaft 70. The protrusions 73 are examples of a "second engaging portion" in the claims.

The operation shaft 70 includes a seal member 74 surrounding the operation shaft 70. The seal member 74 surrounds the large diameter portion 71 of the operation shaft 70. That is, the seal member 74 is located on a first bearing 110.

Figure 11:
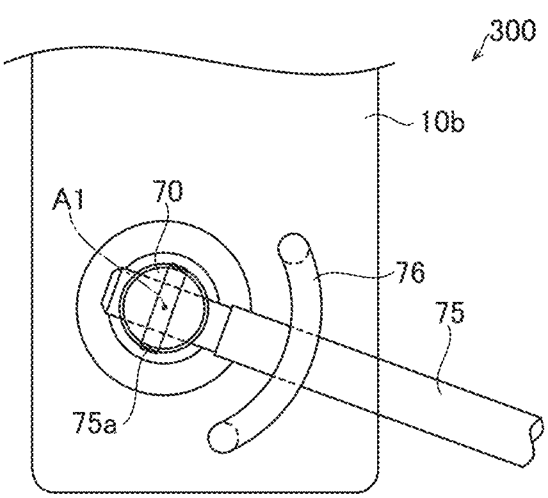
FIG. 11 is a diagram showing an operation lever connected to the operation shaft of the valve device according to the second embodiment.

The operation lever 75 is connected to the operation shaft 70 by a pin 75*a*, as shown in FIG. 11. The operation lever 75 is rotatable with respect to the operation shaft 70 about the pin 75*a*. Furthermore, the operation lever 75 is connected to the operation shaft 70 and moves the operation shaft 70 along the rotation axis A1. Specifically, as shown in FIG. 13, when the operation shaft 70 is coupled to the operation pin 40, the operation lever 75 tilts with a contact portion 76 as a fulcrum to move the operation shaft 70 along the rotation axis A1. Thus, the operation shaft 70 is pushed in and switched to the coupled state in which the operation shaft 70 is coupled to the operation pin 40. Furthermore, the operation lever 75 is tilted in the opposite direction such that the coupled state in which the operation shaft 70 is coupled to the operation pin 40 is released. That is, the operation shaft 70 is pulled out and switched to the uncoupled state in which the operation shaft 70 is not coupled to the operation pin 40.

When the operation lever 75 is rotated in the coupled state in which the operation shaft 70 is coupled to the operation pin 40, the operation pin 40 is rotated about the rotation axis A1. This causes the spool 20 to move.

The contact portion 76 is provided on the outside of the operation lever 75. As shown in FIG. 11, the contact portion 76 has an arcuate shape.

The remaining configurations of the second embodiment are similar to those of the first embodiment.

Advantages of Second Embodiment

According to the second embodiment, the following advantages are achieved.

According to the second embodiment, similarly to the first embodiment described above, the valve device 300 including the manually movable spool 20 can be easily assembled.

According to the second embodiment, as described above, the valve device 300 includes the operation lever 75 connected to the operation shaft 70 to move the operation shaft 70 along the rotation axis A1, and the contact portion 76 contacting the operation lever 75. Furthermore, the operation lever 75 is operable to tilt with the contact portion 76 as a fulcrum to move the operation shaft 70 along the rotation axis A1 when the operation shaft 70 is coupled to the operation pin 40. Accordingly, when the spool 20 is manually moved in an emergency, for example, the operation shaft 70 can be easily switched to the coupled state with the operation pin 40 by operating the operation lever 75. Moreover, the operation lever 75 is moved in the coupled state such that the spool 20 can be easily moved.

The remaining advantages of the second embodiment are similar to those of the first embodiment.

Modified Examples

The embodiments disclosed this time must be considered as illustrative in all points and not restrictive. The scope of the present disclosure is not shown by the above description of the embodiments but by the scope of claims for patent, and all modifications within the meaning and scope equivalent to the scope of claims for patent are further included.

For example, while the example in which the first engaging portions of the operation pin include the grooves, and the second engaging portions of the operation shaft include the protrusions has been shown in each of the aforementioned first and second embodiments, the present disclosure is not limited to this. In the present disclosure, the first engaging portions of the operation pin may include protrusions, and the second engaging portions of the operation shaft may include grooves.

While the example in which the coupling pin of the second engaging portions of the operation shaft has a cylindrical shape has been shown in each of the aforementioned first and second embodiments, the present disclosure is not limited to this. In the present disclosure, the coupling pin of the second engaging portions of the operation shaft may have a shape other than a cylindrical shape. For example, the coupling pin may have a prismatic shape.

While the example in which two first engaging portions of the operation pin are provided with the rotation axis interposed therebetween has been shown in each of the aforementioned first and second embodiments, the present disclosure is not limited to this. In the present disclosure, one or three or more first engaging portions of the operation pin may be provided.

While the example in which the operation shaft includes the large diameter portion and the small diameter portion, and the diameter of the operation shaft changes midway has been shown in each of the aforementioned first and second embodiments, the present disclosure is not limited to this. In the present disclosure, the diameter of the operation shaft may be constant.

Aspects

It will be appreciated by those skilled in the art that the exemplary embodiments described above are specific examples of the following aspects.

(Item 1)

A valve device comprising:

a spool operable to move in an axial direction of the spool to switch a liquid flow path or adjust a liquid flow rate;

an operation pin connected to the spool and operable to rotate about a rotation axis of the operation pin as the spool moves in the axial direction; and an operation shaft operable to be moved along the rotation axis of the operation pin to be switched between a coupled state in which the operation shaft is coupled to the operation pin and rotates together with the operation pin, and an uncoupled state in which the operation shaft is not coupled to the operation pin and supports the operation pin such that the operation pin is rotatable; wherein the operation pin is operable to be rotated about the rotation axis such that the spool is moved when the operation shaft is rotated about the rotation axis in the coupled state.

(Item 2)

The valve device according to item 1, wherein the operation pin includes a first engaging portion operable to engage with the operation shaft; and the operation shaft includes a second engaging portion operable to engage with the first engaging portion of the operation pin, and is operable to enter the coupled state when the second engaging portion engages with the first engaging portion, and to enter the uncoupled state when the second engaging portion does not engage with the first engaging portion.

(Item 3)

The valve device according to item 2, wherein the first engaging portion of the operation pin includes a groove; and the second engaging portion of the operation shaft includes a protrusion operable to engage with the groove.

(Item 4)

The valve device according to item 3, wherein the protrusion of the operation shaft includes a coupling pin inserted into the operation shaft in a radial direction of the operation shaft.

(Item 5)

The valve device according to item 4, wherein the coupling pin has a cylindrical shape.

(Item 6)

The valve device according to any one of items 2 to 5, wherein the first engaging portion of the operation pin includes a plurality of first engaging portions with the rotation axis interposed therebetween.

(Item 7)

The valve device according to any one of items 2 to 6, wherein the operation shaft includes a large diameter portion and a small diameter portion;

the small diameter portion passes through the operation pin and has a smaller diameter than a diameter of the large diameter portion; and the second engaging portion of the operation shaft has a maximum outside dimension smaller than the diameter of the large diameter portion and larger than the diameter of the small diameter portion.

(Item 8)

The valve device according to any one of items 1 to 7, further comprising:

a housing to house the operation pin; wherein the housing includes a first bearing to guide movement of the operation shaft in a direction of the rotation axis and support the operation shaft such that the operation shaft is rotatable about the rotation axis, and a second bearing on a side opposite to the first bearing with the operation pin interposed therebetween to guide the movement of the operation shaft in the direction of the rotation axis and support the operation shaft such that the operation shaft is rotatable about the rotation axis.

(Item 9)

The valve device according to any one of items 1 to 8, wherein the operation shaft includes a male threaded portion at a first end in a direction of the rotation axis, and a female threaded member operable to be screwed into the male threaded portion, and is operable to be moved along the rotation axis to be switched between the coupled state and the uncoupled state when the female threaded member is rotated about the rotation axis with respect to the male threaded portion.

(Item 10)

The valve device according to item 9, wherein the operation shaft further includes a tool engaging portion at a second end in the direction of the rotation axis with which a tool engages.

(Item 11)

The valve device according to item 10, wherein the operation pin is operable to be rotated about the rotation axis such that the spool is moved when the tool engaged with the tool engaging portion of the operation shaft is moved in the coupled state.

(Item 12)

The valve device according to any one of items 1 to 8, further comprising:

an operation lever connected to the operation shaft to move the operation shaft along the rotation axis; and a contact portion contacting the operation lever; wherein the operation lever is operable to tilt with the contact portion as a fulcrum to move the operation shaft along the rotation axis when the operation shaft is coupled to the operation pin.

The invention claimed is:

1. A valve device comprising:

a spool operable to move in an axial direction of the spool to switch a liquid flow path or adjust a liquid flow rate;

an operation pin connected to the spool and operable to rotate about a rotation axis of the operation pin as the spool moves in the axial direction; and an operation shaft operable to be moved along the rotation axis of the operation pin to be switched between a coupled state, in which the operation shaft is coupled by direct engagement to the operation pin and rotates together with the operation pin, and an uncoupled state, in which the operation shaft is not coupled to the operation pin and supports the operation pin such that the operation pin is rotatable, wherein the operation pin is operable to be rotated about the rotation axis such that the spool is moved when the operation shaft is rotated about the rotation axis in the coupled state, the operation pin includes a first engaging portion operable to engage with the operation shaft, and the operation shaft (i) includes a second engaging portion operable to engage with the first engaging portion of the operation pin, (ii) is operable to enter the coupled state when the second engaging portion engages with the first engaging portion, and (iii) is operable to enter the uncoupled state when the second engaging portion does not engage with the first engaging portion.

2. The valve device according to claim 1, wherein the first engaging portion of the operation pin includes a groove; and the second engaging portion of the operation shaft includes a protrusion operable to engage with the groove.

3. The valve device according to claim 2, wherein the protrusion of the operation shaft includes a coupling pin inserted into the operation shaft in a radial direction of the operation shaft.

4. The valve device according to claim 3, wherein the coupling pin has a cylindrical shape.

5. The valve device according to claim 1, wherein the first engaging portion of the operation pin includes a plurality of first engaging portions with the rotation axis interposed therebetween.

6. The valve device according to claim 1, wherein the operation shaft includes a large diameter portion and a small diameter portion;

the small diameter portion passes through the operation pin and has a smaller diameter than a diameter of the large diameter portion; and the second engaging portion of the operation shaft has a maximum outside dimension smaller than the diameter of the large diameter portion and larger than the diameter of the small diameter portion.

7. The valve device according to claim 1, further comprising:

a housing to house the operation pin, wherein the housing includes a first bearing to guide movement of the operation shaft in a direction of the rotation axis and support the operation shaft such that the operation shaft is rotatable about the rotation axis, and the housing includes a second bearing on a side opposite to the first bearing with the operation pin interposed therebetween to guide the movement of the operation shaft in the direction of the rotation axis and support the operation shaft such that the operation shaft is rotatable about the rotation axis.

8. The valve device according to claim 1, wherein the operation shaft (i) includes a male threaded portion at a first end in a direction of the rotation axis, (ii) includes a female threaded member operable to be screwed into the male threaded portion, and (iii) is operable to be moved along the rotation axis to be switched between the coupled state and the uncoupled state when the female threaded member is rotated about the rotation axis with respect to the male threaded portion.

9. The valve device according to claim 8, wherein the operation shaft further includes a tool engaging portion at a second end in the direction of the rotation axis with which a tool engages.

10. The valve device according to claim 9, wherein the operation pin is operable to be rotated about the rotation axis such that the spool is moved when the tool engaged with the tool engaging portion of the operation shaft is moved in the coupled state.

11. The valve device according to claim 1, further comprising:

an operation lever connected to the operation shaft to move the operation shaft along the rotation axis; and a contact portion contacting the operation lever; wherein the operation lever is operable to tilt with the contact portion as a fulcrum to move the operation shaft along the rotation axis when the operation shaft is coupled to the operation pin.

* * * * *